United States Patent [19]

Vago

[11] 3,978,448
[45] Aug. 31, 1976

[54] VEHICLE-TIRE-AIR-PRESSURE-SENSING-AND-INDICATING DEVICE

[75] Inventor: Otto Zoltan Vago, Burns, Tenn.

[73] Assignee: Scovill Manufacturing Company, Waterbury, Conn.

[22] Filed: June 9, 1975

[21] Appl. No.: 585,088

[52] U.S. Cl. ............................... 340/58; 200/61.25
[51] Int. Cl.² ......................................... B60C 23/04
[58] Field of Search ......... 340/58; 200/61.22, 61.25

[56] References Cited
UNITED STATES PATENTS

| | | | |
|---|---|---|---|
| 2,629,086 | 2/1953 | Ainsworth et al. | 340/58 |
| 3,715,719 | 2/1973 | Sugiyama | 340/58 |
| 3,803,550 | 4/1974 | Mirsky | 340/58 |

Primary Examiner—Alvin H. Waring
Attorney, Agent, or Firm—Dallett Hoopes

[57] ABSTRACT

In a vehicle tire pressure indicator system, a reed switch mounted on the vehicle frame adjacent a wheel is connected to indicator means in the vehicle. An elongage tubular housing of generally cylindrical outer configuration is disposed on the wheel lengthwise parallel to the axis of the wheel. One end of the housing, the outer end, is attached to the tire valve while the other end carries a covered bellows on the end of which is a magnet. The housing is situated to be adjacent the reed switch each time the wheel rotates. Tire pressure is communicated to the chamber surrounding the bellows inside the cover so that when tire pressure is high, the bellows shrinks and draws the magnet away from the reed switch, not influencing it. When tire pressure drops, the bellows extends, moving the magnet toward the switch, triggering the indicator means. The bellows is sealed by having its single bore plugged with a ball member. The bellows contains a stop limiting its collapsing movement. Valve means are provided in the outer end of the housing to shut off the communication means with the tire when the communications means is removed from the housing so that the system may be checked without losing tire pressure.

8 Claims, 7 Drawing Figures

VEHICLE-TIRE-AIR-PRESSURE-SENSING-AND-INDICATING DEVICE

BACKGROUND OF THE INVENTION

1. Field of the Invention

This invention relates to a vehicle-tire-air-pressure sensing-and-indicating device. More specifically, the invention relates to means to notify the driver of low tire pressure. The invention pertains to the general type of arrangement in which pneumatic means connected to a vehicle tire drive a magnet inward or outward of the vehicle wheel to affect magnetic-field-responsive switch means mounted on the vehicle body adjacent the wheel, the switch means controlling indicating means within the vehicle.

2. Description of the Prior Art

In the prior art, there are a number of showings of vehicle-tire-pressure-warning systems employing magnets movably disposed on the wheel, the magnets being moved in correspondence to the pressure in the tire. An example is the U.S. Pat. No. 3,654,601 to Munson et al, granted Apr. 4, 1972. Another example is the U.S. Pat. No. 3,521,232 to Poole, issued July 21, 1970. The U.S. Pat. No. 2,629,086 to Ainsworth et al, issued Feb. 17, 1953, is similarly concerned with such an arrangement.

While the devices in the prior art are effective to some extent, they all require substantial modification to the wheel of the vehicle. Poole, mentioned above, for instance, requires a substantial opening in the rim of the wheel. The other devices mentioned involve one or a plurality of perforations in the body of the wheel to permit the passage of pneumatic tubes. Additionally, the prior devices have been difficult and awkward to connect to the magnet-moving means from the tire.

SUMMARY OF THE INVENTION

Under the present invention, there is provided an extremely simple structure by which a simple modification of the wheel hub affects the mounting of the magnet-moving means so that thereafter the tire and wheel used may be connected to the magnet-moving means with no modification of the wheel. This is accomplished by ingeniously doubling in function a portion of the magnet-moving housing and one of the conventional wheel bolts.

BRIEF DESCRIPTION OF THE DRAWINGS

Other features of the invention will be apparent from a study of the following specification including the drawings, all of which show a non-limiting embodiment of the invention. In the drawings.

DESCRIPTION OF THE PREFERRED EMBODIMENT

Figure 1:
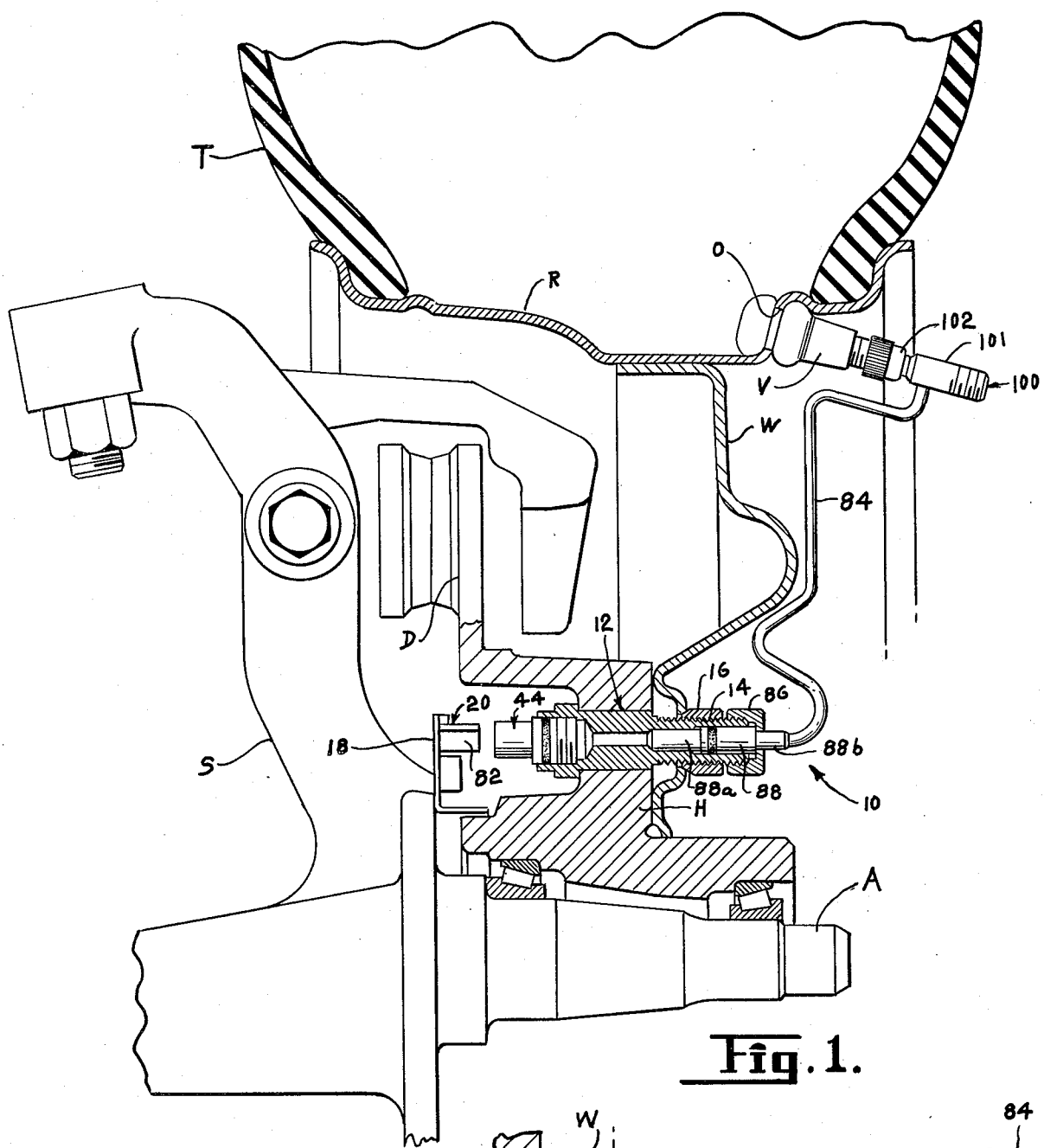
FIG. 1 is a fragmentary, partly in section, view of a vehicle wheel assembly and neighboring parts embodying the invention.

The preferred embodiment of the invention is shown mounted on a vehicle and generally designated 10 in FIG. 1. It comprises a cylindrical housing 12 which is inserted in press fit into an opening in the hub H. Hub H rides on axle A. As shown, the housing 12 terminates outwardly of the vehicle in a threaded end 14 which serves as one of the conventional wheel bolts for the wheel W. Lug nut 16 is used with the threaded end 14 to assist in securing the wheel W to the hub H. The wheel W includes a rim R which mounts a tire T. The rim R is provided with the usual rim hole opening O which has a conventional snap-in tire valve V installed therein.

Disposed on the body of the vehicle adjacent the suspension arm S and inside the brake disc D is a bracket 18 which mounts a magnetic-sensitive switch 20. Switch 20 is connected through appropriate electric means to a display or indicator means inside the automobile in a position such that the driver will be able to respond to such display or indicator means.

Figure 2:
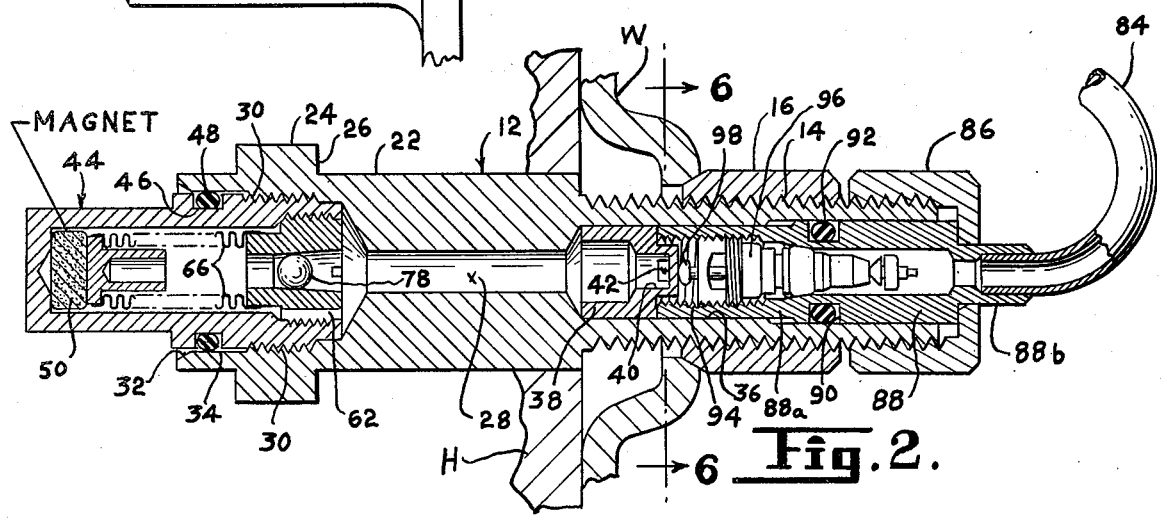
FIG. 2 is an enlarged fragmentary sectional view of the magnet-moving housing embodying the invention.
Figure 7:
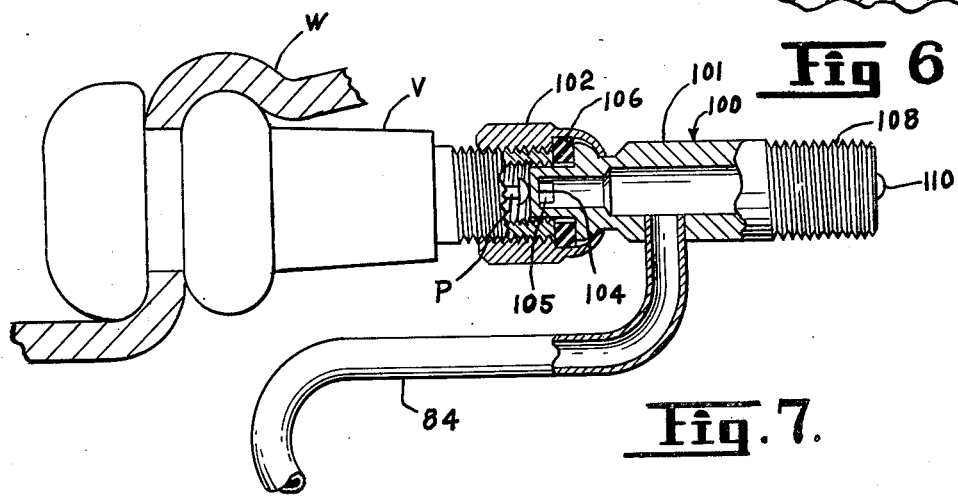
FIG. 7 is an enlarged sectional view of a tire valve fitting useful under the invention.

Referring now to FIG. 2, it will be seen that the housing 12 includes a sturdy cylindrical portion 22 press-fitted into hub H. The cylindrical portion 12 has an annular enlargement 24 which presents a shoulder 26 serving as stop means for the insertion of the housing into the hub. An axial bore 28 is formed in the housing 12 and is greatly enlarged at its inner end and interiorly threaded as at 30. This thread is preceded by a chamfered lead-in 32 and a smooth cylindrical land 34. At its outer end, the bore 28 of the housing 12 is slightly enlarged in a cylindrical land 36 adjacent the outer face of the hub H. This land receives a depresser insert 38 which comprises a bushing press-fitted to bottom out at the inner end of the land 36, the bushing having a raised end 40 thereacross which presents windows 42 for the passage of air (FIG. 7).

Returning now to the inner end of the housing, the housing includes the externally threaded cap 44 of non-magnetic material such as aluminum. Externally, the body of the cap 44 present an annular groove 46 which receives an O-ring 48 and a threaded end. In assembly, the cap 44 is screwed into the threads 30 in the main portion of the housing.

Figure 3:
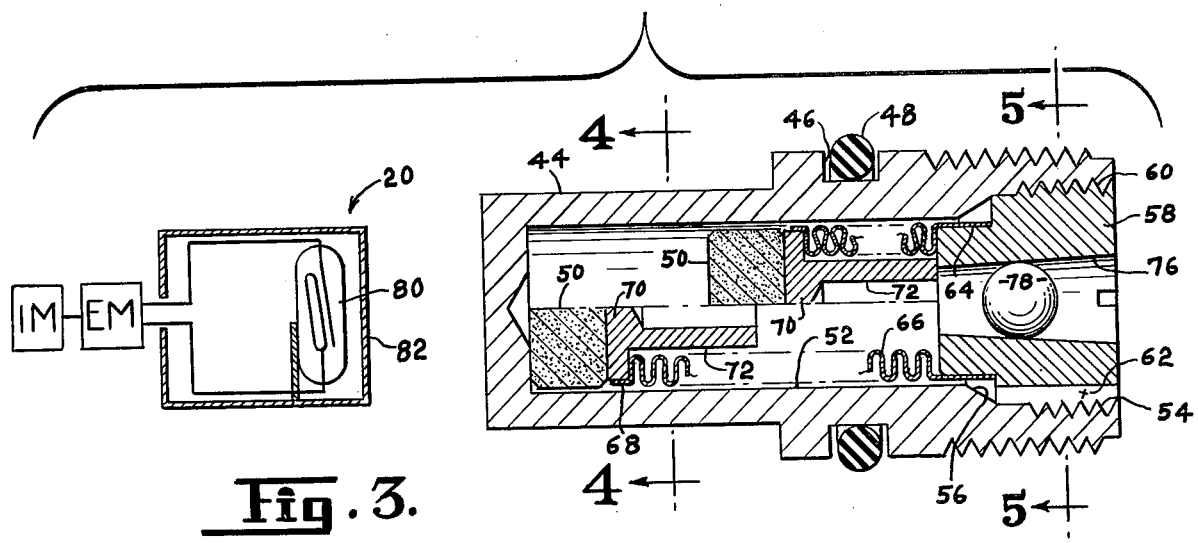
FIG. 3 is an enlarged view of the magnet end of the housing, also showing the magnetic-field-sensitive switch which is mounted on the vehicle body.
Figure 4:
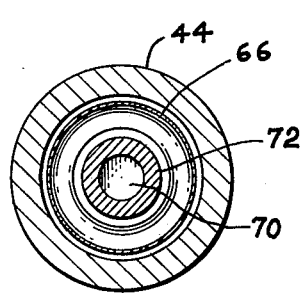
FIG. 4 is a sectional view taken on the line 4—4 of FIG. 3.
Figure 5:
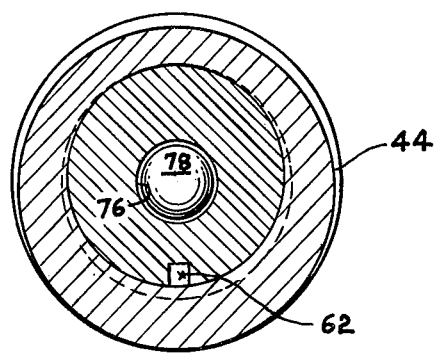
FIG. 5 is a sectional view taken on the line 5—5 of FIG. 3.
Figure 6:
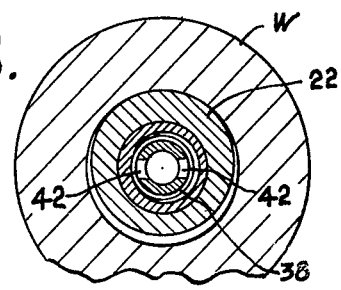
FIG. 6 is a sectional view taken on the line 6—6 of FIG. 2.

As best shown in FIG. 3, the cap 44 includes a cylindrical permanent magnet 50. Interiorly the cap 44 is formed with a smooth cylindrical surface 52. Adjacent its mouth, the cap is internally enlarged and threaded as at 54. A bevelled lead-in surface 56 forms transition between the threaded area 54 and the smooth cylindrical surface 52.

A plug 58 is exteriorly threaded as at 60 and is longitudinally channelled as at 62 for reasons which will appear. The plug is reduced in size at its inner end to provide a bellows mounting surface 64 and collapsible bellows 66 has one end mounted in sealed tight fashion on the surface 64. The other end of the bellows is secured to the peripheral surface 68 of the outer end of a flange at the end wall 70 of a stop member 72. It is to this end wall 70 that the magnet 50 is cemented or otherwise secured. The plug 58 is formed with a central tapered bore 76, the plug being of somewhat soft material such as brass, or a tough plastic such as nylon. Into the bore is wedged a steel sealing ball 78 effectively sealing the bellows charged at a selected pressure.

As shown somewhat schematically in FIG. 3, the sensing means 20 may include a conventional reed switch 80, the opposite terminals of which are connected through electric means EM, well known in the art, to suitable indicator means IM, also well known in the art, such as a dashboard light. The reed switch 80 is suitably protected by a housing 82 of non-magnetic material. The positioning of the sensitive switch may be adjustable to reflect a suitable response to the position of the magnet 50.

Referring again to FIG. 2, tube means 84 connect the threaded end of the housing 12 to the tire valve V. Adapter means are provided at the housing and comprise a threaded thimble 86 adapted to screw onto the threaded end 14 and having an end wall apertured to receive the tube means 84. The adapter comprises a tubular cylindrical body 88 which is stepped down to provide an end 88a of lesser diameter. An annular groove 90 is formed on the body and receives an O-ring 92. The body 88 is connected to the tube means 84 through nipple 88b. The body is formed with a bore which terminates in an interiorly threaded inner end 94. As shown, end 94 receives a conventional tire valve core 96. The core presents the usual operating pin 98. The parts are so proportioned that, when thimble 86 is tightened, the raised end 40 depresses the pin 98 opening its valve as shown (FIG. 2) completing the communication from the tube means 84 into the bore 28.

The other end of the tube means 84, best shown in FIG. 7, comprises a tire valve adapter 100 which includes a tubular body 101 having a swivelly-attached thimble 102 at the end attached to the valve. The body 101 has a valve pin depresser means 104 having lateral passages 105, well known in the art. As shown, a seal 106 is provided so that when the thimble 102 is secured onto the end of the tire valve V, there is a leakproof connection to the interior of the body 101, and the depresser 104 holds down the pin P in the valve V, thereby establishing a communication between the tube means 84 and the interior of the tire. The outer end of the body 101 is exteriorly threaded as at 108 and threaded interiorly to receive a valve core, not shown, having a pin 110. Thus, the tire may be filled using a conventional garage air supply connection against the end 108, engaging pin 110. Body end 108 may be provided with a dust cap, if desired or necessary.

OPERATION

The operation of the embodiment disclosed will be apparent from the description. The air pressure in the tire T communicates through the valve V, passages 105, body 101, the tube means 84, through core 96, windows 42, passage 28, channel 62, the passage provided by chamfer 56, to the annular space around the sealed bellows 66. Because the chamber defined inwardly by the bellows is not in communication with this space and contains air at a relatively fixed pressure varying only slightly as the length of the bellows changes, it will be understood that there is a correlation between the air pressure in the tire and the position of the magnet 50 as determined by the extension of the bellows 66. The pressure within the bellows chamber, thus, elongates the bellows when the pressure inside the cap 44 and surrounding the bellows drops. This is what happens when the air pressure inside the tire T falls. The magnet 50 will, at low tire pressure, therefore, move toward and finally assume the position shown in the lower half of FIG. 3.

On the other hand, when the tire pressure is increased, it will communicate from the tire as described above to the annular space about the bellows 66. This high pressure forces the bellows to fill a lesser volume under cap 44 causing it to shrink back so that at high tire pressure the magnet 50 assumes the position shown in the upper half of FIG. 3 with stop 72 abutting plug 58. "High tire pressure" herein means any pressure over an acceptable minimum.

The position of the magnet 50 will, as the wheel rotates, have an effect or not upon the electrodes of the switch 80. At the exact point at which the cap 44 is in alignment with the switch means 20, the magnetic field of magnet 50, if the magnet is in the extended position shown in the lower half of FIG. 3, closes the electrodes within the switch 80. This closing, through appropriate electrical circuit means well known in the art, will register on the indicator means inside the vehicle. This will continue as long as the magnet 50, due to the low air tire pressure, will be in the position shown in the lower half of FIG. 3.

In conditions in which the tire pressure is of acceptable pressure, the magnet 50 drives the bellows 66 to the collapsed state, taking the position shown in the upper half of FIG. 3. In this magnet position, even when the cap 44 is directly opposite the switch means 20, there will be no actuation of the switch 80 because the magnet 50 is of sufficient distance from the switch 80 so that its magnetic field does not affect the switch sufficiently to close its contacts. Because the contacts are not closed, there will be no indication of the indication means to tell that the tire air pressure is low.

During the changing of a tire, it is merely necessary to remove the thimble 86 and withdraw the adapter 88, 88a. Such withdrawing disengages the pin 98 from the depresser 42 so that the valve in core 96 closes, blocking discharge of air from the tire.

At the other end, the tube means 84 is disconnected from the tire valve by removing the thimble 102. The removal of depresser 104 permits the pin inside the tire valve V to move outward closing the conventional valve core. Subsequently, the lug nut 16 is removed along with the other lug nuts on the wheel and the wheel may then be removed from the hub H. With the replacement wheel in position on the hub with each of the wheel bolts extending through a bolt hole on the wheel, the lug nut 16 is tightened on the threaded end 14 of the housing as are the other lug nuts tightened on their respective bolts. The adapter 88, 88a is positioned into the stepped opening and the pin 98 engages the depresser 42 to open the valve 96 (as shown in FIG. 2). Subsequently, or previously, it does not matter which, with the arrangement shown, the special extension at the other end of the tube means 84 is screwed into position on the valve V with the thimble 102 tightened down snugly on the end of the valve V causing the depression of the valve core as the depresser 104 engages the pin of the valve. The assembly is now ready to operate.

It should be clear that there are many variations and modifications from the embodiment disclosed, all of which fall under a definition of the invention which may be expressed in the following claim language.

I claim:

1. In a vehicle-tire-air-pressure-sensing-and-indicating device having magnetic-field sensitive switch means mounted on the vehicle adjacent the wheel connected through electrical means to indicating means within the vehicle, magnet means, mounting means on the wheel assembly mounting the magnet means for movement toward and away from the switch means in directions parallel to the axis of the wheel, the mounting means comprising a bellows having one end fixedly supported on the wheel assembly, the other end carrying the magnet means, and housing means surrounding the bellows and connecting means connecting the housing means to the tire; the improvement wherein the bellows has a central bore at one end closed by a ball member to seal the bellows and the bellows is formed with an internal axially disposed elongate stop means limiting the collapse of the bellows, the housing means comprises an elongate, generally cylindrical tubular element disposed in a circular opening in the wheel structure and lying in a disposition parallel to the axis of the wheel and the connecting means includes tube means connected to the outer portion of the housing means and extending to the usual fill valve fitting of the tire on the wheel.

2. A vehicle-tire-air-pressure-sensing-and-indicating device as claimed in claim 1 wherein the bellows includes internal stop means extending in a direction longitudinal of the bellows to prevent collapse of the bellows beyond a certain length when the pressure in the tire is high.

3. A vehicle-tire-air-pressure-sensing-and-indicating device as claimed in claim 2 wherein the stop means extends from the magnet end of the bellows toward the stationary end.

4. A vehicle-tire-air-pressure-sensing-and-indicating device as claimed in claim 1 wherein the outer end of the housing is threaded and the tube means is connected to the threaded end of the housing by an adapter having a valve core biased toward open disposition with an outwardly-facing operating pin, the adapter being inserted into the threaded end, threaded thimble means on the threaded end holding the adapter projecting into the threaded end, and stationary depresser means in the housing depressing the core pin to open the valve when the adapter is so projected.

5. A vehicle-tire-air-pressure-sensing-and-indicating device as claimed in claim 1 wherein the bellows is sealed.

6. In a vehicle-tire-air-pressure-sensing-and-indicating device having magnetic-field sensitive switch means mounted on the vehicle adjacent the wheel connected through electrical means to indicating means within the vehicle, magnet means, mounting means on the wheel assembly mounting the magnet means for movement toward and away from the switch means in directions parallel to the axis of the wheel, the mounting means comprising a bellows having one end fixedly supported on the wheel assembly, the other end carrying the magnet, the bellows containing a gas at substantially uniform pressure at all times, and having tubular housing means surrounding the bellows and connecting means connecting the housing means to the tire; the improvement wherein the housing means includes an elongate generally cylindrical tubular element enclosing and coaxial with the bellows and mounted on the wheel and extending lengthwise in a direction parallel to the axis of the wheel, the bellows being sealed and containing an axially disposed elongate stop means to limit the collapsing movement of the bellows, the connecting means including tube means connected to the outer end of the housing means and extending to the usual fill valve fitting of the tire on the wheel, and valve means in the connecting means at the housing means adapted to close automatically the connecting means when the connecting means is disconnected from the housing means as in testing the device.

7. A device as claimed in claim 6 wherein the valve means comprises a spring-pressed poppet-type valve biased toward closed disposition disposed in the connecting means and normally held open by means on the housing when the connecting means is connected to the housing means.

8. A device as claimed in claim 6 wherein the housing is disposed at a radius on the wheel equal to the radius on the wheel of the conventional wheel holding studs.

* * * * *